Nov. 7, 1950 C. W. WALZ ET AL 2,528,804
BEET HARVESTER
Filed Feb. 12, 1945 2 Sheets-Sheet 1

INVENTORS
CLAUDE W. WALZ
ROBERT D. GRIFF
BY
ATTORNEYS

Nov. 7, 1950     C. W. WALZ ET AL     2,528,804
BEET HARVESTER
Filed Feb. 12, 1945     2 Sheets-Sheet 2
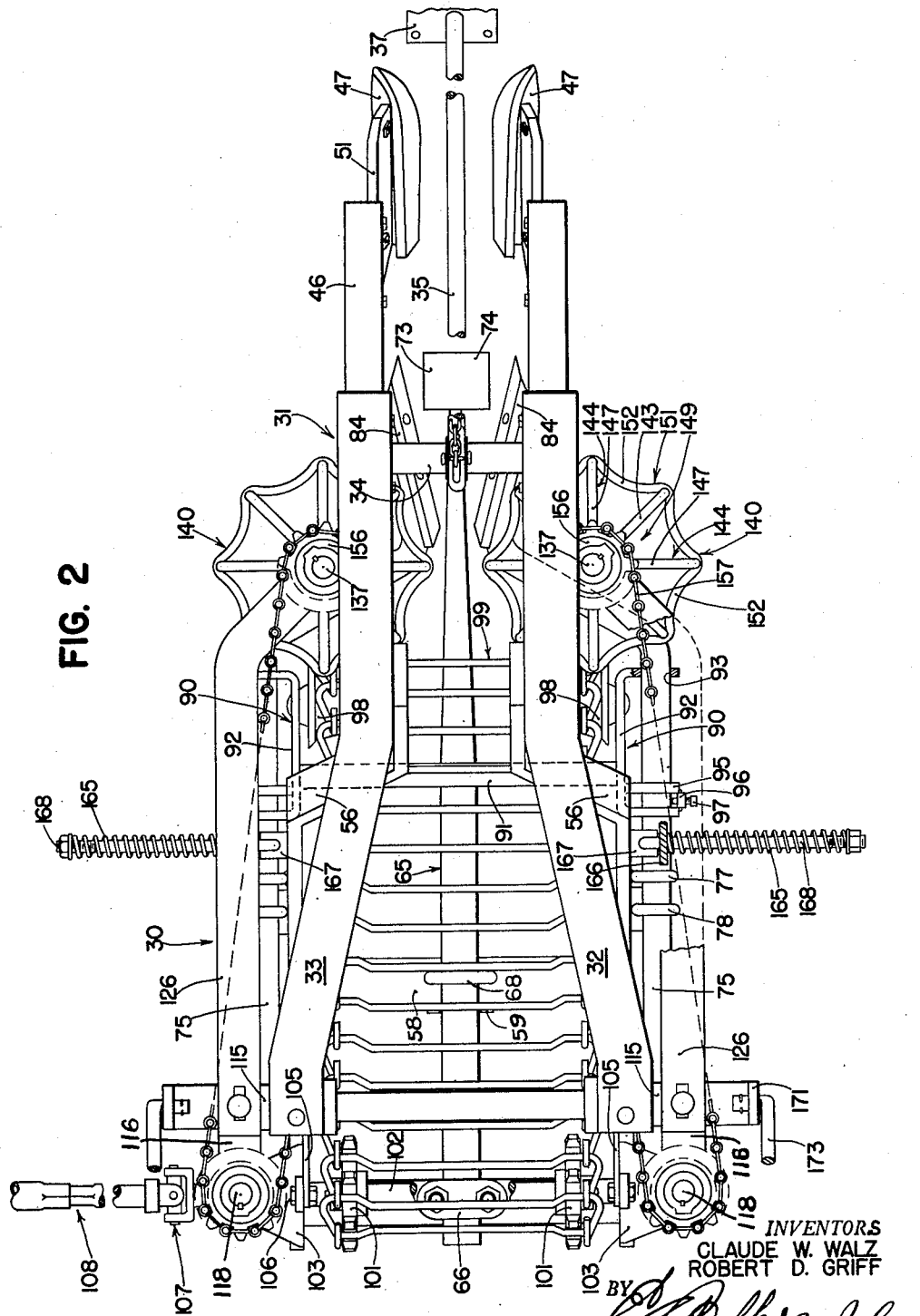
FIG. 2
INVENTORS
CLAUDE W. WALZ
ROBERT D. GRIFF
BY
ATTORNEYS Patented Nov. 7, 1950

2,528,804

UNITED STATES PATENT OFFICE 2,528,804

BEET HARVESTER

Claude W. Walz and Robert D. Griff, Rock Island, Ill., assignors to Deere & Company, Moline, Ill., a corporation of Illinois Application February 12, 1945, Serial No. 577,555

16 Claims. (Cl. 55—106)

The present invention relates generally to agricultural machines and more particularly to beet harvesters and other machines for harvesting root crops and the like.

The object and general nature of the present invention is the provision of new and improved beet lifting means particularly adapted for use with beet harvesters and the like but not necessarily limited thereto. More particularly, it is a principal feature of the present invention to provide new and improved beet lifting means which, in the first place, prevents the formation of any substantial amount of clods during the process of loosening and lifting the beets and, in the second instance, prevents the passage of any clods or the like through the machine with the beets.

Specifically, one feature of the present invention is the provision of a beet lifting unit which has a single centrally disposed tool member adapted to run along the row under the surface of the ground and loosen or break the beet away from its tap root, in connection with modified lifting points which are so constructed and arranged that the beet is lifted, after it has been loosened and/or separated from its tap root, by lifter points that do not break up the ground into clods or chunks of soil similar in size to beets, the lifter points serving only as means for lifting the beet to a point where it may be engaged by suitable beet handling elevator means while leaving all clods or the like on the ground.

These and other objects and advantages of the present invention will be apparent to those skilled in the art after a consideration of the following detailed description, taken in conjunction with the accompanying drawings in which the preferred form of the present invention has been illustrated.

In the drawings:

Figure 2 is a view taken generally along the line 2—2 of Figure 1.

Figure 1:
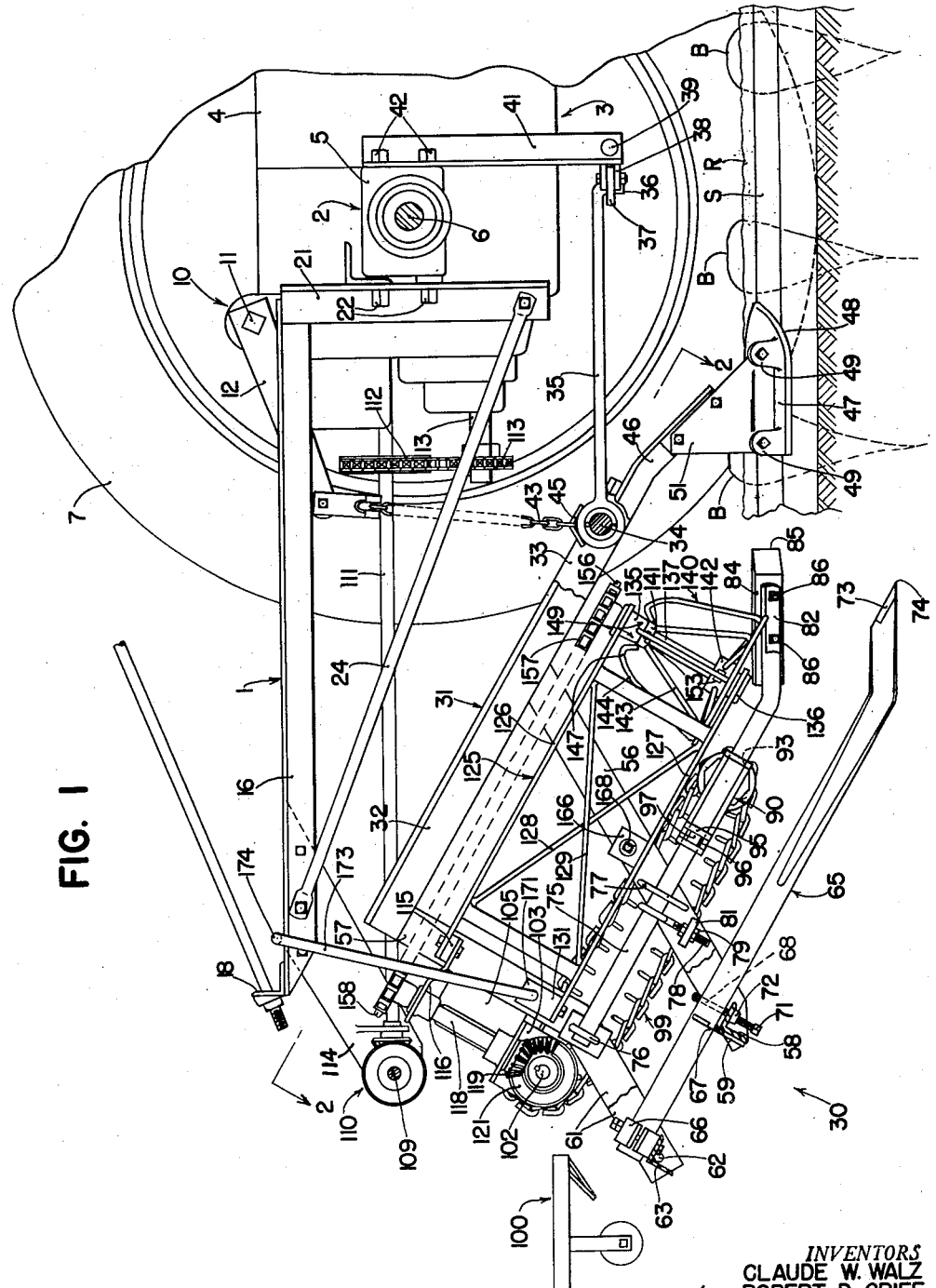
Figure 1 is a side view of our improved beet lifting mechanism, showing the same as incorporated in a mechanical harvester for sugar beets.

Referring first to Figure 1, a beet harvester in which, for purposes of illustration, the present invention has been incorporated, comprises a supporting framework 1 mounted on the rear axle 2 of a conventional farm tractor 3. Preferably, the tractor includes a combination frame and case 4 from the rear portion of which the rear axle 2 extends. The latter includes sleeve or wheel extensions 5 receiving a pair of axle shafts 6 on which rear traction wheels 7 are fixed. The tractor 3 is equipped with a power lift unit, indicated in its entirety by reference numeral 10, which comprises a rockshaft 11 to which one or more power lift arms are fixed. The tractor 3 also includes a power take-off shaft 13 from which power is derived for operating the various parts of a harvester, including the rotatable or driven parts of the lifter which forms the principal subject matter of the present invention.

The harvester framework 1 is generally rectangular in plan and includes right and left hand longitudinal frame bars 16 and a rear angle bar 18, together with suitable cross braces and other parts, as set forth in greater detail in the U. S. Patent 2,438,627, issued March 30, 1948, to Claude W. Walz, Clarence T. Rasmussen and Robert D. Griff. At its forward end the longitudinal frame bars 16 are connected to generally downwardly extending frame bars 21 which are fixed, as at 22, to the rear axle 2, preferably on the rear side thereof, each set of frame bars 16 and 21 being reinforced by a brace 24.

The lifter unit with which the present invention is more particularly concerned which is indicated in its entirety by the reference numeral 30, comprises a frame unit 31 supported from the beet harvester frame 1 for generally lateral and vertical floating movement relative thereto. The frame 31 includes an upper pair of angles 32 and 33 having forwardly converging end portions that are rigidly connected together by a connecting member 34 forming a drawbar for unit 30. A drag link 35 is connected at its rear end with the drawbar 34 and at its forward end is connected, as at 36, to a draft plate 37 which in turn is connected by a pair of swivels 38 to a transverse bar 39 carried at the lower ends of a pair of angles 41 bolted, as at 42, to the front sides of the rear axle 2. Thus, forward draft is transmitted by the link 35 to the front end of the lifter unit 30 in a manner to accommodate both vertical and lateral movement thereof. Secured to the drawbar 34, as by welding, is a loop 45 in which the lower end of a chain 43 is connected. The chain 43 extends upwardly and at its upper end is connected with one or both of the power lift arms 12. Any suitable means may be provided, if desired, for adjusting the vertical position of the front end of the unit 30, but preferably the latter floats along the ground surface. Secured to the front end of each of the frame angles 32 and 33 is a shoe support angle 46 which extends downwardly and forwardly and at its lower end each of the angles 46 carries a guide shoe 47. Preferably, each guide shoe includes a curved soil and/or beet engaging surface 48 and is provided with a pair of attaching lugs 49 which receive and are bolted to the lower edge portion of a connecting and reinforcing member 51 which at its upper end is connected to the associated angle 46. These guide shoes 48 are thus connected rigidly to and serve as a forward part of the connecting frame assembly 31.

The frame 31 also includes a pair of downwardly extending bars 56 and 57 at each side. Each of the forwardly disposed bars 56 is welded at the upper end to the associated frame angle, 32 or 33, and the bars 56 are shaped to diverge downwardly so that their lower ends are spaced apart a distance farther than the spacing between the front ends of the frame bars 32 and 33. The lower ends of the bars 56 are connected together by an angle 58 which is disposed transversely of the frame 31 and carries a shank-receiving clip 59. The rear bars 57 are formed to extend downwardly and rearwardly, as at 61, and are apertured to receive studs 62 carried by a rear beam supporting angle 63. A lifter beam 65 is disposed in a downwardly and forwardly extending position and is clamped at its rear end to the rear angle 63 by clamp means 66. The angle 63 pivots in the stud-receiving openings in the lower ends of the angles 61, and the clip 59 is provided with a U-shaped notch 67 serving as a guide to receive the lifter beam 65 in its operating position and serving as a stop limiting its downward movement relative to the frame 31. A U-bolt 68 holds the lifter beam down against an adjusting screw 71. The working position of the front end of the lifter beam 65 is capable of being adjusted by loosening the U-bolt 68 and adjusting the set screw 71. The latter has threaded engagement with a nut member 72 welded to the flange of the angle 58 adjacent the beam seat 67. The front end of the lifter beam 65 is provided with a point member 73, preferably sharpened, as indicated at 74, and serves as means for initially loosening the beet and in at least some cases partially or completely severing the beet from its tap root during the progress of the machine in operation, as will be referred to below.

A pair of blade shanks 75 are connected with the frame side members 56 and 57, the rear end of each blade shank being pivotally connected by an eyebolt 76 to the associated frame member 57, and, forwardly thereof, a looped eyebolt 77 is received by the associated front frame bar 56. The vertical position of each blade shank 75 is adjusted by means of a blade adjusting bolt 78 which receives the shank 75 and has a threaded end secured, as by a pair of lock nuts 79, to an apertured lug 81 fixed to the lower end of the associated frame bar 56. Each blade shank 75 is flattened at its forward end, as at 82, and receives a lifter blade 84 having a sharpened and hardened end 85. The blades 84 are disposed in a generally fore and aft position and each comprises a generally rectangular member fairly narrow in a vertical direction. The blades 84 are apertured, as are the forward ends 82 of the blade shanks 75, to receive attaching bolts 86. By suitably loosening one of the lock nuts 79 at each side of the unit 30 and tightening the other, the vertical position of the lifter blades may be varied, as desired.

The two blade shanks are connected rigidly together by an elevator cone frame assembly indicated in its entirety by the reference numeral 90 and comprising a transverse pipe member 91 having secured to its ends a pair of U-shaped yoke sections 92. These sections are apertured, as at 93, to receive the blade shanks 75, and an auxiliary plate 95 is welded to each yoke 92 adjacent one end thereof to receive a tapped nut 96 welded to the piece 95 and the yoke end adjacent thereto. The nuts 96 receive cap screws 97 or the like whereby the blade shanks 75 may be securely clamped in the elevator cone frame assembly 90.

Elevator cones 98 are carried by the member 90 and receive an elevator chain 99, the rear end of which discharges into a receiving hopper 100 (Figure 1). The elevator chain 99 is trained over sprockets 101 carried by and fixed to a shaft 102 which is supported in a pair of brackets 103, one at each side of the frame 31 at the rear thereof. Each bracket 103 is connected rigidly to the associated rear frame bar 57 by means of an attaching plate 105 to which the associated bracket 103 is bolted, as at 106, each plate 105 being secured as by welding to the associated frame bar 57. The shaft 102, as best shown in Figure 1, is disposed in fairly close proximity to the pivot bolts 76 defining the transverse axis about which the shanks 75 move when the vertical position of the front ends thereof is adjusted, it being understood that when the shanks 75 are adjusted vertically the front end of the elevator chain 99 is carried with them, and since the axis defined by the shaft 102 is adjacent the axis defined by the bolts 76, there is no appreciable change in the effective length of the elevator chain 99 when the shanks 75 are adjusted. The laterally inner end of the shaft 102 is connected by means including a universal joint 107 and a telescoping shaft assembly 108 to a transverse shaft 109. The latter is driven by means of a pair of bevel gears 110 from a longitudinally extending shaft 111 and the latter is driven by a sprocket chain 112 from a sprocket 113 that is carried at the rear end of the tractor power takeoff shaft 13. The universal joint just mentioned and the telescoping shaft assembly 108 permit the lifter unit 30 to take different positions with respect to the main frame 1 without affecting the drive from the tractor to the elevator chain 99. The shaft 109 is supported on the rear end of the frame 1.

Near its upper end, each of the side frame bars 57 carries a laterally outwardly extending bracket 115, and a rearwardly directed extension 116 is connected at its forward end to the bracket 115. The rear end of each extension 116 is apertured to receive the upper end of a generally vertically disposed shaft 118. At the lower end of the latter a bevel gear 119 is fixed, the bevel gear 119 meshing with a bevel gear 121 secured to the associated end of the cross shaft or elevator driving shaft 102. A kicker wheel frame 125 is pivoted to the frame 31 at each side thereof, and each kicker wheel frame 125 includes an upper bar 126, a lower bar 127, together with suitable vertical and diagonal bracing members 128 and 129. The upper and lower bars 126 and 127 are pivotally connected, respectively, to the outer ends of the upper bracket 115 and a lower apertured lug 131 carried on the associated vertical frame bar 57. The forward ends of each of the frame members 126 and 127 are formed to extend forwardly and outwardly and receive, respectively, upper and lower bearing members 135 and 136 in which a shaft member 137 is turned for rotation. A kicker wheel 140 is secured to each of the shafts 137 and each kicker wheel comprises an upper collar 141 and a lower collar 142. Spoke sections 143 alternate with larger spoke section 144 and are secured to the collars 141 and 142 as by welding. The inner spoke sections 143 have the upper ends fixed into the upper collar 141 so as to extend directly downwardly and leading outwardly therefrom, while the upper portions of the outer spoke section 144 are formed as upwardly arched portions 147. This construction provides what might be termed beet-receiving pockets 149, each pocket being formed by two adjacent arched portions 147 and the straight portion at the upper end of the intermediate or inter-spoke section 143. A ring 151 is welded to the lower and radially outer portion of each of the spoke sections 143 and 144 and is formed with arcuate portioins 152 between the several spokes. Set screws 153 or the like are threaded into the collars 141 and 142 for the purpose of fixing the associated kicker wheel to the shaft 137.

The upper end of each of the shafts 137 receives a sprocket 156 over which a driving sprocket chain 157 is trained. The rear end of each of the sprocket chains 157 is trained over a sprocket 158 fixed to the upper end of the associated shaft 118. It was described above that the lower end of the shaft 118 is driven from the cross shaft 102 by bevel gearing indicated at 119 and 121. Each of the kicker frames 125 is pivoted for laterally inner and outer movement relative to the lifter frame 31 by the upper and lower pivots which, as described above, connect the kicker wheel frame bars 126 and 127 to the brackets 115 and 131. However, laterally outward movement of each of the kicker wheel frames is restrained by a spring 165 bearing at its inner end against a clip 166 fixed to the lower kicker wheel frame bar 127 and bearing at its outer end against an adjusting nut on a bolt 168 that is connected at its inner end to a clip 167 on the adjacent frame bar 56. The laterally inward movement of each kicker wheel frame is limited by the engagement of the frame with the frame bar 56. An apertured bracket 171 is fixed to each frame bar 57, preferably between the upper and lower kicker wheel frame pivots, and receives the lower end of a hanger link 173, the upper end of which is formed with a hook section 174 that engages over the associated main frame angle 16 of the main frame 1. This suspends the rear end of the lifter unit 30 for movement relative to the frame that accommodates both for and aft shifting as well as a limited amount of vertical movement.

The operation of the preferred form of the invention as described above is substantially as follows. The implement is placed in operating position by actuating the tractor power lift to lower the arms 12 which, acting through the lifting chain 43, lowers the unit 30 into operating position, the lifter beam 65 quickly penetrating the ground to the desired depth as the outfit travels forwardly. The operating depth is determined largely by the setting of the lifter beam adjusting screw. The parts are so adjusted that, when the guide shoes 48 run along the top of the ground and on opposite sides of the ridges R in which the beets B normally grow, the shoes being guided by the shoulders S (Figure 1) in the soil formed along the row of beets by the forward pair of colters (not shown), or by the crown portions of the beets that extend from the ground, the lower point 73 is in a position to loosen the beet in the ground by pushing against and breaking away the soil around the lower part of the beet, also pulling out or breaking off the tap root of the beet, at about the time the upper lifting points 84 come into engagement with the upper portion of the beet. The upper lifter points 84 converge rearwardly so that as the machine continues to move forwardly a lifting force is exerted on the beet. The blades or points 84 are relatively narrow and penetrate the ground for only a very short distance. Hence, the blades or points do not tend to bring any large clods of soil up into the kicker wheels. However, the lifting blades, 84, although narrow, do exert sufficient effort on the beets to raise them into the kicker wheels without breakage or damage to the beets, due principally to the fact that the point 73 has already loosened the beet in the ground and hence the resistance to lifting the beets is materially reduced. After being raised by the lifter blades or points 84, the beets are engaged by the kicker wheels 140 about the time the beets approach the rear converged or closely spaced portions of the upper points 84 so as to eliminate any tendency for the latter to overturn the beets. Instead, the beets are projected rearwardly where they are carried rearwardly and upwardly by the elevator chain 99 and eventually discharged into a beet elevator 100.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a beet lifter, a pair of generally vertically spaced beet engaging soil penetrating means, said first means comprising means adapted to penetrate the ground and loosen the beet from the surrounding soil, said first means being positioned to operate generally below the major portion of the beet, and said second means also adapted to penetrate the ground and engage the beet substantially simultaneously with the engagement of the beet by said first means, said second means comprising a pair of lifter points mounted generally directly above said first means and having substantially horizontally disposed rearwardly converging portions, the forward ends of which are spaced apart laterally so as to lie in vertical fore and aft extending planes passing laterally outwardly of said lower beet-loosening means and at opposite sides thereof, being thereby arranged to operate on opposite sides of the beet generally below the ground surface and engage the beet to lift the same after it has been loosened by said first means.

2. In a beet lifter, a pair of generally vertically spaced beet engaging soil penetrating means, one means being disposed substantially directly above the other means, said first means comprising means adapted to penetrate the ground and loosen the beet from the surrounding soil, said first means being positioned to operate generally below the major portion of the beet, and said second means comprising a pair of lifter points mounted generally above said first means and arranged to operate on opposite sides of the beet adjacent but below the ground surface and engage the beet to lift the same after it has been loosened by said first means, said first and second lifting means being spaced apart vertically with an open space therebetween so as to permit the major portion of the soil above the lower means to pass between the latter and the upper points, said first and second means being arranged longitudinally so that the lower means acts upon each beet slightly in advance of the action of the upper means, the upper means acting upon each beet before the beet leaves the lower means.

3. The invention set forth in claim 2, further characterized by said first beet engaging soil penetrating means comprising a tool, and means for mounting said tool below said second beet engaging soil penetrating means and in a generally vertical longitudinally extending plane passing between the lifter points of said second beet engaging soil penetrating means.

4. The invention set forth in claim 2, further characterized by beet engaging and elevating means comprising a pair of rotatable kicker wheels, means for mounting said kicker wheels above the lifter points, an elevator of the endless type, and means for mounting said elevator in a position extending generally rearwardly and upwardly from a point below the rear portions of the kicker wheels and above the rear portions of said pair of lifter points.

5. A beet lifter comprising mobile supporting means, a lifter frame connected with said supporting means for lateral movement relative thereto, a pair of beet engaging lifter points connected rigidly with said lifter frame, a generally rearwardly extending beet conveyor unit carried by said lifter frame in a position to receive beets from said points, and a pair of guide parts also connected rigidly with said lifter frame and disposed ahead of said points for guiding the frame to hold said points on the row and maintain the elevator unit in proper position relative to the flow of beets moving from the points to the elevator, said guide parts being spaced apart laterally approximately the same amount as the lateral spacing between said lifter points.

6. In a beet lifter, a lifting frame unit including a pair of lifter points disposed adjacent the forward end of said frame unit, a pair of laterally swingable arm members pivotally connected, respectively, at their rear ends with the rear portion of said frame unit, the forward ends of said arms being disposed respectively adjacent said lifter points, a beet engaging kicker wheel rotatably mounted at the forward end of each of said laterally swingable arms, said arms extending downwardly and forwardly along said frame unit, means acting through the frame unit and said arms for resiliently urging said arms to move toward one another, and means carried by said frame unit for driving said kicker wheels.

7. In a beet lifter, a lifting frame unit including a pair of lifter points connected with said frame unit and disposed adjacent the forward end of said frame unit, a pair of laterally swingable arm members pivotally connected, respectively, at their rear ends with the rear portion of said frame unit, the forward ends of said arms being disposed respectively adjacent said lifter points, a beet engaging kicker wheel rotatably mounted at the forward end of each of said laterally swingable arms, said arms extending downwardly and forwardly along said frame unit, means acting through the frame and said arms for resiliently urging said arms to move toward one another, and means for driving said kicker wheels including rotatable shafts disposed, respectively, in the axis of lateral swinging of said arms.

8. The invention set forth in claim 6, further characterized by a beet elevator extending upwardly and rearwardly along said frame unit in generally parallel relation with respect to said laterally swingable arms.

9. In a beet lifter, a tap root severing tool adapted to penetrate the ground and sever the tap root of the beets, a pair of lifter points mounted substantially directly above the forward end of said tool and arranged to operate under the ground surface and engage the beet to lift the same after the tap root thereof has been severed by said tool, and elevating means disposed above said tool and generally rearwardly of said lifter points for elevating the beet after the same has been lifted by said points.

10. A beet lifter unit comprising means serving as a downwardly and forwardly extending supporting frame mounted for lateral shifting movement, said frame means including a pair of laterally spaced lifting members fixed at the forward and lower end of said frame, a pair of beet-engaging guide shoes fixed to said frame forward of said laterally spaced members and adapted to engage the ground so as to hold said frame means on the row, and beet lifting means carried by and movable laterally with said frame means.

11. A beet lifter unit comprising means serving as a supporting frame, a pair of laterally spaced generally downwardly extending shanks carried by said frame means, a pair of laterally spaced lifter points carried by the lower ends of said shanks, downwardly and forwardly extending tool means connected at its rear end with the rear portion of said frame means and disposed at its forward end below said lifter points and generally between the vertical longitudinal planes of said points, and beet engaging and conveying means disposed rearwardly of said points but forwardly of the upper rear portion of said tool means for receiving beets from said points and conveying them rearwardly and upwardly.

12. A beet lifter unit comprising means serving as a supporting frame, a pair of laterally spaced generally downwardly extending shanks carried by said frame means, a pair of laterally spaced lifter points carried by the lower ends of said shanks, and downwardly and forwardly extending tool means connected with the rear portion of said frame means and disposed at its forward end below and having its forward end disposed between the planes of said lifter points.

13. In a beet lifter, a pair of generally vertically spaced beet engaging soil penetrating means, said first means comprising means adapted to penetrate the ground and loosen the beet from the surrounding soil, said first means being positioned to operate generally below the major portion of the beet, said second means comprising a pair of lifter points mounted generally above said first means and arranged to operate on opposite sides of the beet adjacent the ground surface and engage the beet to lift the same after it has been loosened by said first means, and a pair of rotatable beet-engaging parts disposed substantially above the rear ends of said lifter points for engaging and elevating the beet after it has been lifted by said lifter points.

14. In a beet harvester, frame means, a pair of generally vertically spaced beet engaging soil penetrating means carried by said frame means in a position to penetrate the ground and loosen the beet from the surrounding soil, said first means being positioned to operate generally below the major portion of the beet, said second means comprising a pair of lifter points carried by said frame means and mounted generally above said first means and arranged to operate on opposite sides of the beet adjacent the ground surface and engage the beet to lift the same after it has been loosened by said first means, a pair of rotatable beet-engaging parts, and means movably connecting said beet-engaging parts with said frame means for bodily movement toward and away from one another transversely of said pair of lifter points, said beet-engaging parts being disposed substantially above the rear ends of said lifter points for engaging and elevating the beet after it has been lifted by said lifter points.

15. A beet lifter unit comprising means serving as a supporting frame, a pair of laterally spaced generally downwardly extending shanks carried by said frame means in a position so that the lower portions of said shanks are normally disposed below the ground surface in operation, a pair of laterally spaced lifter points carried by the lower ends of said shanks so as to operate below the surface of the ground, downwardly and forwardly extending tool means connected with said frame means and disposed at its forward end below and generally between said laterally spaced points, and means for fixing said tool means in a position substantially midway between the vertical longitudinal planes of said laterally spaced lifter points.

16. In a beet harvester, frame means, a pair of vertically spaced beet engaging point means carried by said frame means, the lower point means being positioned to loosen the beet from the ground around the lower portion of the beet and the upper point means comprising a pair of relatively narrow rearwardly converging points positioned to raise the beet from the loosened ground and having their forward ends spaced apart laterally a distance greater than the lateral dimension of said lower point means, and means carried by said frame means in a position to act principally on the beet adjacent the rearwardly converged portion of said upper points for preventing the forward travel of the latter relative to the ground from overturning the beet.

CLAUDE W. WALZ.
ROBERT D. GRIFF.

REFERENCES CITED

The following references are of record in the file of this patent:

UNITED STATES PATENTS

| Number | Name | Date |
| --- | --- | --- |
| 839,918 | Conner | Jan. 1, 1907 |
| 891,184 | McCormick | June 16, 1908 |
| 1,479,929 | Ricks | Jan. 8, 1924 |

FOREIGN PATENTS

| Number | Country | Date |
| --- | --- | --- |
| 89,111 | Germany | Nov. 4, 1896 |
| 869 | Great Britain | of 1907 |
| 420,343 | Great Britain | 1934 |